Figure 1:
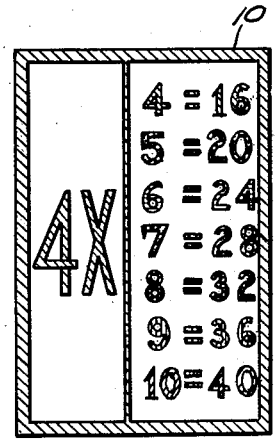
Figure 2:
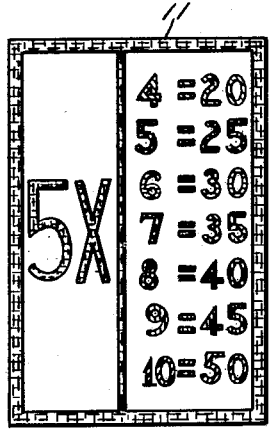

Sept. 1, 1959  D'ALAN E. HUFF  2,901,839

EDUCATIONAL DEVICE FOR TEACHING ARITHMETIC

Filed Feb. 20, 1958

INVENTOR

D'ALAN E. HUFF

BY

ATTORNEY

United States Patent Office 2,901,839
Patented Sept. 1, 1959

2,901,839

EDUCATIONAL DEVICE FOR TEACHING ARITHMETIC

D'Alan E. Huff, Chillicothe, Ohio

Application February 20, 1958, Serial No. 716,453

1 Claim. (Cl. 35—70)

This invention relates to an educational device which may be utilized in the teaching of elementary mathematics, such as the multiplication tables to children or others requiring rudimentary mathematical education.

A primary object of the invention is the provision of such a device wherein various symbols as for example, numbers and combinations of such numbers are associated with a particular color, whereby recognition of the color will assist in the recognition of the symbol or numbers combination, thereby facilitating the determination of the correct response to that particular problem situation.

An additional object of the invention is the provision of such a device which includes a plurality of cards, or a plurality of card indicia in the form of a chart, each card containing a key symbol, having a sign, such as the multiplication sign associated therewith, and a series of numbers by which the initial or main symbol is to be multiplied, together with the total associated with such multiplication.

A further object of the invention is the provision of means whereby a selected combination of numbers may be indicated for solution, such means taking the form of an indicating element such as a pair of dice, or the like, which may be tossed at random, or which, alternatively, set to predetermined combinations to provide a specific problem.

A further object of the invention is the provision of such a device wherein the individual numbers on each die correspond in color to the same symbol on the card or chart.

A further object of the invention is the provision of such an arrangement wherein a given symbol retains a given color throughout all the component parts.

Still other objects reside in the combinations of elements, arrangements of parts, and details of construction, all as will be more fully pointed out hereinafter and disclosed in the accompanying drawing wherein there is shown one illustrative embodiment of the instant invention.

In the drawing:

Figure 1 is a front plan view of a card or representation of a card on a chart showing a colored main number, together with a multiplication indicia, and a column showing numbers by which the main number is to be multiplied, and the corresponding totals when such multiplication is achieved.

Figures 2 to 7 inclusive are views similar to Figure 1, but showing different main numbers, in different color combinations.

Figure 8:
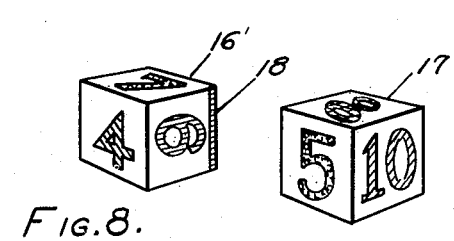

Figure 8 is a perspective view of a pair of dice showing the corresponding indications on the dice for application to a particular for the solution of a particular problem in multiplication.

The drawings are lined for color, and similar reference characters refer to similar parts throughout the several views of the drawing.

Figure 3:
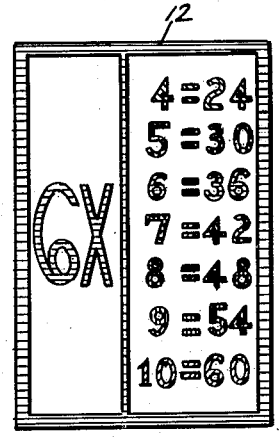
Figure 4:
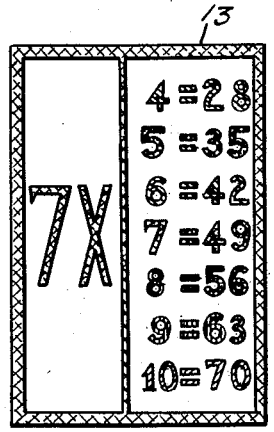
Figure 5:
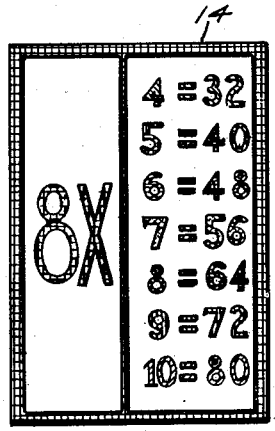
Figure 6:
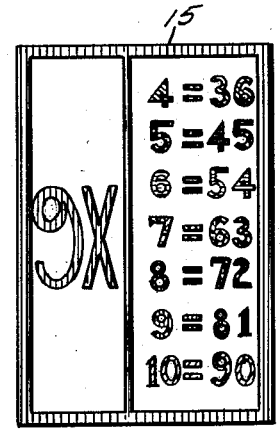
Figure 7:
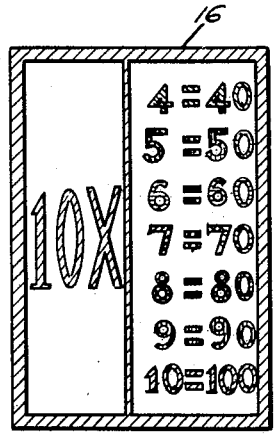

Having reference now to the drawing and more particularly to Figure 1, there is generally indicated at 10, a card having a main number which is the number four on the left hand side thereof, together with the multiplication sign (×) adjacent thereto. The number four and its associated sign are lined, illustratively, for green, and the card is bordered in a corresponding color. A central divisional line also of green separates the main number from a sequential series of numbers ranging from four to ten, each colored differently, indicating a number to be multiplied by four. In this column the number four is also lined for green, while the succeeding numbers are lined for their corresponding colors. For example, the card in Figure 2 generally indicated at 11 is lined for yellow or gold, the main number is five. It will be noted that the number five is also similarly lined in the right hand column of both cards 10 and 11, as it is similarly in card 12 as shown in Figure 3 and cards 13, 14, 15 and 16 as shown in Figures 4 to 7 inclusive. The card having the main number six is lined for blue, while the cards carrying the main numbers 7, 8, 9 and 10 are lined respectively for orange, black, red and brown, it being noted that the selection of colors is arbitrary, and may be varied at will, so long as the same color remains constant throughout the several cards to represent a particular number. It will also be noted that the columns in the right hand side of each figure are substantially identical, with the coloration of the numbers, corresponding to the coloration of the main numbers in the individual cards.

Referring now to Figure 8, the dice 16' and 17 bear on each of the surfaces thereof, a number, which corresponds to one of the main numbers in the left hand column of each card, and is correspondingly lined for color. One of the dice 16' carries numbers only from four to nine, while the other dice carries numbers from five to ten, thus any combination of numbers to be multiplied from four times five to ten times nine may be reproduced either at random upon a throw of the dice, or by the individual positioning of each die to present a selected problem. For example when the dice lie as shown, with the number seven in orange uppermost on one die, and the number eight in black uppermost on the other, either the card 13 or the card 14 may be selected, and in the case of the card 13 the number eight is searched out in the right hand column, with the resultant that orange seven times black eight gives a resultant of fifty six. This also being lined for black.

If the opposite combination is selected the black main eight times the orange seven in the right hand column also gives fifty six, in this instance the fifty six being lined for orange.

Obviously additional combinations may be worked out as desired in accordance with the position of the dice. It is to be noted that each die carries a strip 18 at the bottom of both the numbers 9 and 6 for the purpose of differentiating therebetween, the strip 18 as shown in Figure 8 on the die 16', being lined for red and corresponds to the number nine which it indicates.

Obviously other arrangements of indicia and numbers may be worked out as desired, as for example, the multiplication sign may be supplanted by the addition symbol on each card, and the totals correspondingly reevaluated. The divisional sign and the subtraction sign may be also employed, with corresponding modifications in the symbol utilized on the cards and dice or other indicator.

Instead of the dice it will also be understood that a revolving indicator associated with certain numbers or combinations of numbers may be also supplied, or any other indicia which lends itself to a chance indication, or to a preselected indication for a given problem.

Obviously multiple sets of cards may be employed which the same indicator if utilized, the only limitation being the requirement that each symbol be designed by a specified and particular color, and that this color symbol association be maintained constant through the several elements of the device, More complex problems than the multiplication or the addition of simple numbers may be also worked out by various color combinations, as will be readily apparent from a consideration of the construction of the elements.

From the foregoing it will now be seen that there is herein provided an improved educational device which accomplishes all of the objects of this invention, and others, including many advantages of great practical utility and importance in education.

As various embodiments may be made of this inventive concept, and as various modifications may be made in the embodiments hereinbefore shown and described, it is to be understood that all matter herein is to be interpreted merely as illustrative and not in a limiting sense.

What is claimed is:

In an educational device, charts having a different main number in a different color and a sign for a functional operation, said number and sign being of a selected color, said chart also bearing a column of numbers together with the result when said main number is operated upon in accordance with the accompanying sign in conjunction with a selected number in said column, each of said numbers in a different column being of a different color, an indicator bearing a plurality of numbers, each of said last mentioned numbers being of a different color, a given color representing a single number and its associated result throughout, said charts being in the form of cards, each card bearing a different main number in a different color, and said indicator comprising a pair of dice whereby a main number may be selected from one dice and another number selected from the other dice and such combination matched with a corresponding combination of numbers on said cards to produce a result.

References Cited in the file of this patent

UNITED STATES PATENTS

| | | |
|---|---|---|
| 1,244,000 | Soltoft | Oct. 23, 1917 |
| 1,528,061 | Joyce | Mar. 3, 1925 |
| 2,562,633 | Needham | July 31, 1951 |

FOREIGN PATENTS

| | | |
|---|---|---|
| 758,251 | Great Britain | Oct. 3, 1956 |